(12) United States Patent
Lauter et al.

(10) Patent No.: US 7,594,261 B2
(45) Date of Patent: Sep. 22, 2009

(54) CRYPTOGRAPHIC APPLICATIONS OF THE CARTIER PAIRING

(75) Inventors: Kristin E. Lauter, La Jolla, CA (US); Denis X. Charles, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 11/053,339

(22) Filed: Feb. 8, 2005

(65) Prior Publication Data

US 2006/0177051 A1 Aug. 10, 2006

(51) Int. Cl.
*G06F 9/00* (2006.01)
*H04L 9/32* (2006.01)
*H04L 9/00* (2006.01)
*H04K 1/00* (2006.01)
*G09C 1/00* (2006.01)
*H04L 9/30* (2006.01)

(52) U.S. Cl. .......................... 726/14; 713/176; 713/181; 380/28; 380/30

(58) Field of Classification Search .................... 726/14
See application file for complete search history.

(56) References Cited

U.S. PATENT DOCUMENTS

| 5,442,707 | A | 8/1995 | Miyaji et al. |
| 6,212,279 | B1 | 4/2001 | Reiter et al. |
| 6,252,959 | B1 | 6/2001 | Paar et al. |
| 7,024,559 | B1 | 4/2006 | Solinas |
| 2005/0094806 | A1 * | 5/2005 | Jao et al. ...................... 380/30 |

FOREIGN PATENT DOCUMENTS

| GB | 2389678 A | 12/2003 |
| JP | 2006221161 A * | 8/2006 |

OTHER PUBLICATIONS

J. Miret, D. Sadornil, J. Tena, R. Tomàs, M. Valls, Isogeny cordillera algorithm to obtain cryptographically good elliptic curves, Jan. 2007, ACSW '07: Proceedings of the fifth Australasian symposium on ACSW frontiers—vol. 68, vol. 68, Publisher: Australian Computer Society, Inc., pp. 153-157.*

Carter et al. "Isogenies and Duality of Abelian Varieties" Annals of Mathematics, Princeton University Press, Princeton, NJ, pp. 315-351.

Dutta et al., "Pairing-Based Cryptographic Protocols: A Survey" Cryptology Research Group, Feb. 6, 2004, pp. 1-45.

Guajardo et al., "Efficient Algorithms fo Elleptic Curve Cryptosystems" Berlin, Springer, DE, Conf. 17, Aug. 17, 1997, pp. 342-356.

(Continued)

*Primary Examiner*—Matthew B Smithers
*Assistant Examiner*—Courtney D Fields
(74) *Attorney, Agent, or Firm*—Lee & Hayes, PLLC

(57) ABSTRACT

Systems and methods for cryptographically processing data as a function of a Cartier pairing are described. In one aspect, a Cartier pairing is generated from two different abelian varieties or abelian varieties and an isogeny between them. Data is cryptographically processed based on the Cartier pairing.

19 Claims, 5 Drawing Sheets

OTHER PUBLICATIONS

Hankerson et al. "Guide to Elliptic Curve Cryptography" Springer-Verlag, NY, pp. 75-113.

Lopez et al., "An Improvement of the Guafardo-Paar Method for Multiplication on Non-Supersingular Elliptic Curves" Nov. 9, 1998, pp. 91-95.

Hankerson, "Elliptic Curve Arithmetic", pp. 1-42.

Blake, Ian et al., "Elliptic Curves in Cryptography" Chapter IV "Efficient Implementation of Elliptic Curves" 1999, Cambridge University Press, pp. 1-25.

Sakai, Yasuyuki, et. al., "Efficient Scalar Multiplications on Elliptic Curves without Repeated Doublings and Their Practical Performance", 2000, Springer Berlin Heidelberg, pp. 1-15.

Sakai, Yasuyuki, et al., "Efficient Scalar Multiplications on Elliptic Curves with Direct Computations of Several Doublings" Jan. 2001, IEICE Transactions on Fundamentals of Electronics, Communications, and Computer Sciences, Engineering Sciences Society, Tokyo JP, vol. E84-A, No. 1, 10 pages.

* cited by examiner

CRYPTOGRAPHIC APPLICATIONS OF THE CARTIER PAIRING

TECHNICAL FIELD

The systems and methods of this specification relate to cryptographic processing.

BACKGROUND

Existing pairing based cryptographic systems use Weil or Tate pairings evaluated at points on an abelian variety, for example, an elliptic curve. For a fixed natural number m, the Weil pairing em is a bilinear map that takes as input two m-torsion points on the elliptic curve, and outputs an m th root of unity. For instance, for a fixed natural number m, the Weil pairing em is a bilinear map that takes as input two m-torsion points on an elliptic curve, and outputs an mth root of unity.

SUMMARY

Systems and methods for cryptographically processing data as a function of a Cartier pairing are described. In one aspect, a Cartier pairing is generated from two different abelian varieties and an isogeny between them. Data is cryptographically processed based on the Cartier pairing.

BRIEF DESCRIPTION OF THE DRAWINGS

In the Figures, the left-most digit of a component reference number identifies the particular Figure in which the component first appears.

DETAILED DESCRIPTION

Overview

Figure 1:
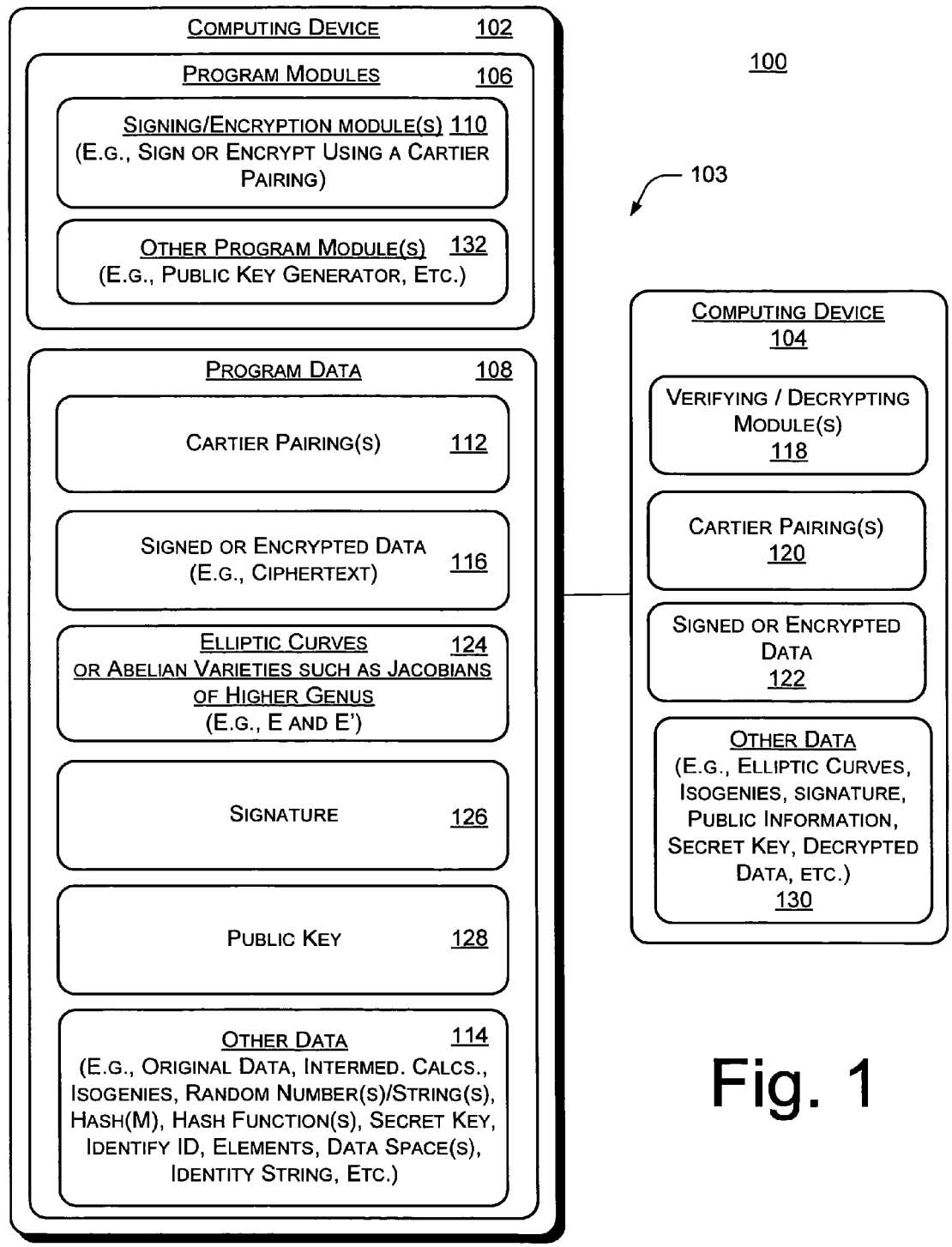
FIG. 1 illustrates an exemplary system for cryptographically processing data based on Cartier pairings.

Systems and methods for cryptographic application of Cartier pairing are described below in reference to FIGS. 1 through 5. A Cartier pairing is denoted by $e_\phi(-,-)$, indicating that the pairing is evaluated at elements P and P' from two (2) different groups of points. Each group of points is from one of two elliptic curves E and E' defined over a finite field $F_q$, where $\phi$ is an isogeny from E to E'. Techniques to identify these elements P and P' are described below in reference to FIG. 2. An isogeny (p from an elliptic curve E to an elliptic curve E' is a map from E to E' which is a group homomorphism and which is given coordinate-wise by rational functions in the coordinates.

Let m denote the degree of the isogeny, which is equal to the size of the kernel of $\phi$, if $\phi$ is separable. For P a point on E in the kernel of $\phi$, and P' a point on E' in the kernel of the dual isogeny $\hat{\phi}$, and Q a point on E with the property that $\phi(Q)=P'$, the Cartier pairing with respect to the isogeny $\phi$ is defined as follows: $e_\phi(P, P')=e_m(P, Q)$, where $e_m(P, Q)$ is the $m^{th}$ Weil pairing on the curve E. The properties of the Cartier pairing are well known (e.g., see Katz et al., "Arithmetic Moduli of Elliptic Curves" Princeton University Press, 1985, pp. 87-91, or Cartier, "Isogenies and duality of abelian varieties", Ann. Math., vol. 71, 1960, p. 315-351). The Cartier pairing can also be implemented for any isogeny of abelian varieties. Thus to implement the Cartier pairing, it suffices to find pre-images of points under an isogeny, and to evaluate the Weil pairing. (An exemplary procedure for evaluating the Cartier pairing is described below in reference to FIGS. 2 and 3).

The systems and methods or cryptographic applications of Cartier pairing are used to cryptographically process data using any type of pairings-based cryptographic protocol. Such cryptographic protocols include, for example, those used to implement identity-based cryptography (e.g., plain, blind, proxy, ring, undeniable, etc.), encryption protocols (e.g., authenticated, broadcast, encryption with keyword search, etc.), batch signatures, key agreement (plain, authenticated, group, etc.), trust authorities and public key certification, hierarchical cryptosystems, threshold cryptosystems and signatures, chameleon hash and signatures, authentication, applications and systems, access control, key agreement, non-interactive key distribution, credentials (e.g., anonymous, hidden, self-blindable, etc.), secret handshakes, provably secure signatures, short signatures, aggregate, ring, and verifiably encrypted signatures, blind and partially blind signatures, proxy signatures, undeniable signatures, signcryption, multi-signatures and threshold signatures, limited-verifier and designated-verifier signatures, threshold cryptosystems, hierarchical and role-based cryptosystems, chameleon hash and signatures, verifiable random functions, strongly insulated encryption, intrusion-resilient encryption, certificate-less PKC, al, traitor tracing, and/or so on. As a result, the systems and methods for cryptographic application of Cartier pairing provide an alternative to pairing-based cryptographic systems that implement respective ones of such cryptographic protocols based on Weil or Tate pairings evaluated at points on an elliptic curve or abelian variety.

These and other aspects of the systems and methods for cryptographic application of the Cartier pairing are now described in greater detail.

An Exemplary System

Although not required, the systems and methods for cryptographic application of the Cartier pairing are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for cryptographic application of Cartier pairing. System 100 includes a first computing device 102 coupled over a communications network 103 to a second computing device 104. Communications network 103 may include any combination of a local area network (LAN) and a general wide area network (WAN) communication environments, such as those which are commonplace in offices, enterprise-wide computer networks, intranets, and the Internet. First and second computing devices 102 and 104 represent any type of computing device such as a personal computer, a laptop, a server, handheld or mobile computing device (e.g., a cellular phone, personal digital assistant), and/or so on.

Computing device 102 includes program module(s) 106 and program data 108. Program modules 106 include, for example, signing encrypting module 110 and other program modules 111. Signing/encrypting module 110 respectively signs or encrypts original data as a function of a Cartier pairing 112. Such original data is shown as a respective portion of "other data" 114. Original data that has respectively been signed or encrypted by signing/encrypting module 110 is shown as encrypted or signed data 116. That is, cryptographically processed data 122 is signed when signing/encrypting module 110 cryptographically signs original data as a function of Cartier pairing 112, and cryptographically processed data 122 is encrypted when signing/encrypting module 110 encrypts original data as a function of Cartier pairing 112. Exemplary techniques implemented by signing/encrypting module 110 to generate a Cartier pairing 112 and to utilize the Cartier pairing 112 to cryptographically process (i.e., respectively sign or encrypt) original data are described below in reference to FIGS. 2 through 4. For purposes of discussion, when signing/encrypting module 110 cryptographically signs original data, signing/encrypting module 110 is referred to as signing module 110. Analogously, when signing/encrypting module 110 encrypts original data, signing/encrypting module 110 is referred to as encrypting module 110.

A second computing device, device 104 of FIG. 1, also includes program modules and program data to cryptographically process data based on a Cartier pairing. For instance, program modules include verifying/decrypting module 118 to verify or decrypt cryptographically processed data 122 based on a Cartier pairing. That is, verifying/decrypting module 118 verifies cryptographically processed data 122 when cryptographically processed data 122 has been signed as a function of a Cartier pairing 112, and verifying/decrypting module 118 decrypts cryptographically processed data 122 that has been encrypted as a function of a Cartier pairing 112. Cryptographically processed data 122 represents signed or encrypted data 116 that has been communicated by device 102 to device 104. Exemplary techniques to respectively verify or decrypt cryptographically processed data 122 as a function of Cartier pairing 120 are described below in reference to FIGS. 2 through 4. For purposes of discussion, when verifying/decrypting module 118 cryptographically verifies signed data 122, verifying/decrypting module 118 is referred to as verifying module 118. Analogously, when verifying/decrypting module 118 decrypts data 122, verifying/decrypting module 118 is referred to as decrypting module 118

Exemplary Generation and Cryptographic Application of a Cartier Pairing

Figure 2:
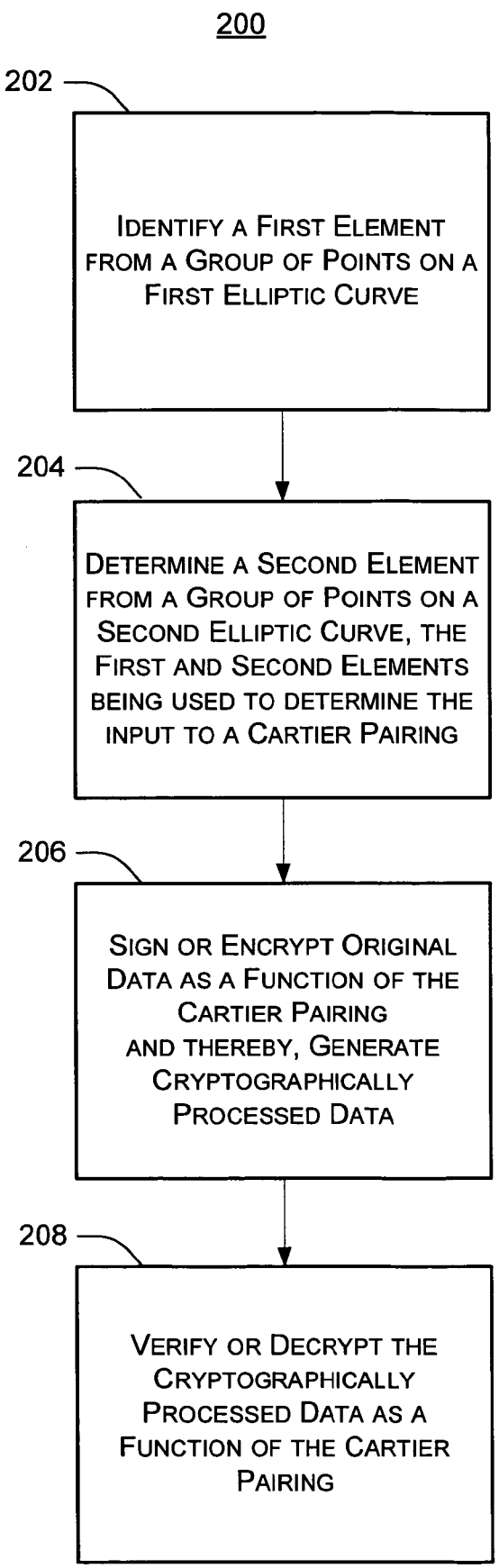
FIG. 2 shows an exemplary procedure to cryptographically process data based on Cartier pairings.

FIG. 2 shows an exemplary procedure 200 for cryptographic application of the Cartier pairing. For purposes of discussion and exemplary illustration, the operations of procedure 200 are described with respect to components of FIG. 1. To this end, the left-most digit of a component reference number identifies the particular figure in which the component first appears.

At block 202, signing/encrypting module 110 (FIG. 1) identifies a first element from a group of points on a first elliptic curve E over a finite field $F_q$. More particularly, a first element P is defined as a point in $E(F_q)$, wherein E is shown in FIG. 1 as an abelian variety or an elliptic curve 124. This first element P should be in the kernel of the isogeny $\phi$ from E to E'.

At block 204, signing/encrypting module 110 (FIG. 1) determines a second element from a group of points on a second abelian variety or elliptic curve over a finite field $F_q$, E' related to E by the isogeny $\phi$, wherein E' is shown in FIG. 1. More particularly, a second element P' is a point on $E'(F_q)$ in the kernel of the dual isogeny $\hat{\phi}$, as a function of the particular cryptographic application being implemented. For example, and as described below in reference to FIG. 3, which describes an exemplary cryptographic signature scheme based on Cartier pairing 112, element P' may be defined as a message M hashed onto the second elliptic curve E', which is eventually used to sign the message M. In another example, P' may be a point chosen so that the messages M may be hashed onto the elliptic curve E' as multiples of the point P'.

At block 206, signing/encrypting module 110 signs or encrypts original data as a function of the Cartier pairing 112 defined by P and P' to generate cryptographically processed data (i.e., signed or encrypted data 116). At block 208, verifying/decrypting module 118 respectively decrypts or verifies the signed or encrypted data 116. For purposes of illustration, signed or encrypted data 116 is shown in computing device 104 as cryptographically processed data 122). The decrypting or verifying functions of block 208 are performed as a function of Cartier pairing 120. The particular pairing-based cryptology algorithm selected at blocks 206 and 208 to process (e.g., sign or encrypt, and analogously verify or decrypt) the data is a function of the purpose and of the particular pairing-based cryptographic algorithm selected for implementation. However, and for purposes of exemplary illustration, a procedure for signing/encrypting module 110 to sign original data using Cartier pairing 112, and for verifying/decrypting module 118 to verify the signed data 116 using Cartier pairing 120, is described below in reference to FIG. 3. In another example, an identity-based encryption (IBE) procedure for encrypting original data using a Cartier pairing 112 and for and decrypting encrypted data 122 based on Cartier pairing 120 is described below in reference to FIG. 4. We now describe such exemplary implementations.

Exemplary Cryptographic Signing of Data Based on Cartier Pairing

Figure 3:
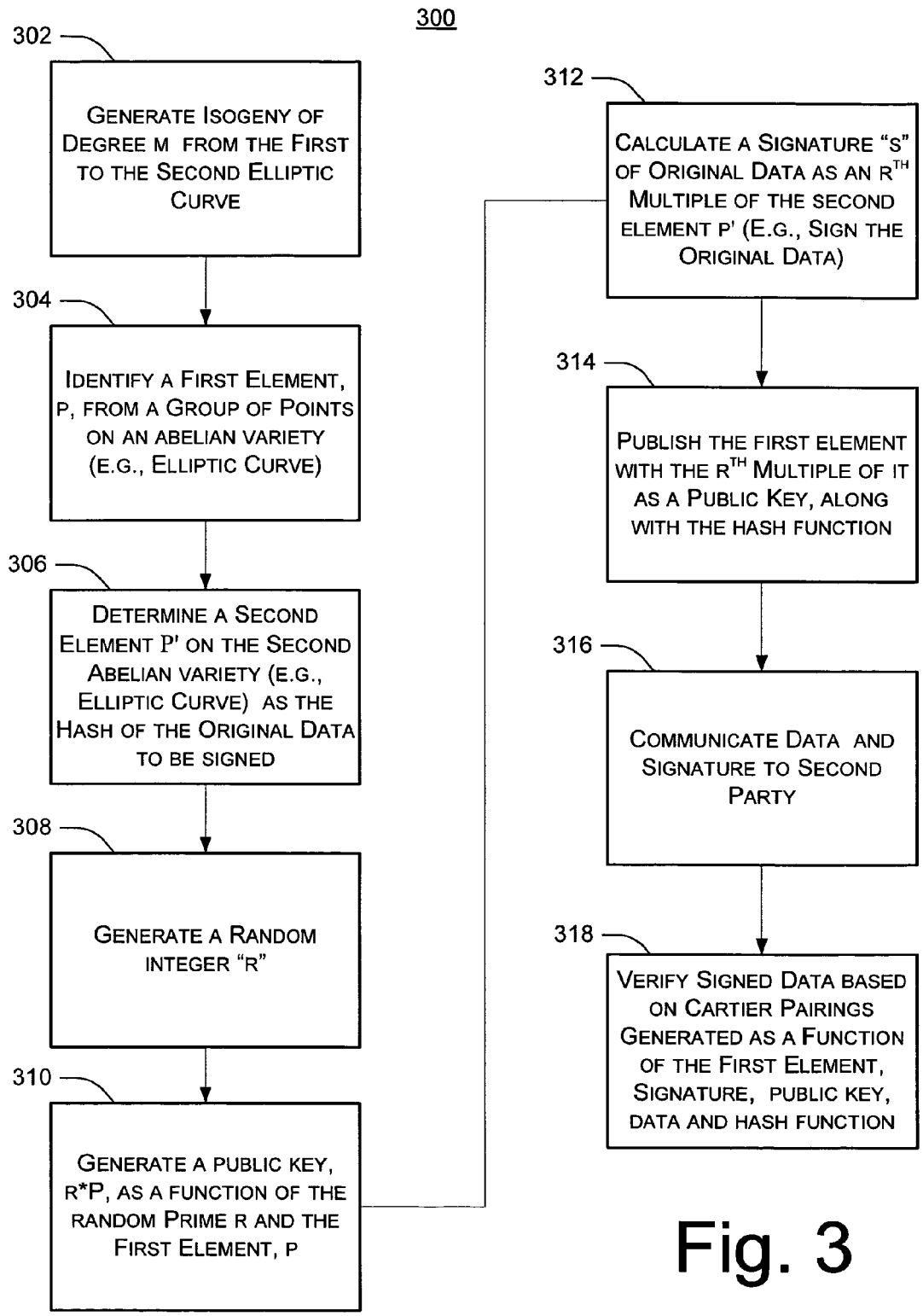
FIG. 3 shows an exemplary procedure to cryptographically sign and verify data based on Cartier pairings.

FIG. 3 shows an exemplary procedure 300 to cryptographically sign and verify data based on Cartier pairings. For purposes of discussion and exemplary illustration, the operations of procedure 300 are described with respect to components of FIG. 1. To this end, the left-most digit of a component reference number identifies the particular figure in which the component first appears.

In the exemplary cryptographic implementation of procedure 300, signing/encrypting module 110 is a signing module. Signing module 110 implements an arbitrary pairing-based cryptographic signature protocol. For instance, once Cartier pairing 112 is determined, the pairing 112 is used to respectively sign and verify data using any of the possible pairing-based signing and verifying cryptographic algorithms. In one implementation, for example, signing module 100 implements a digital signature protocol as follows.

Referring to FIG. 3 and block 302, signing module 110 determines an isogeny $\phi$ of degree m between two elliptic curves or abelian varieties E and E'. At block 304, signing module 110 determines a first element P of $E(F_q)$ in the kernel of the isogeny $\phi$. At block 306, signing module 110 determines the second element P' by hashing a message M onto the second elliptic curve E' using public hashing function h. That is, P' is defined as a hash of a message M, h(M), wherein the hash function h is from the message space $\{0,1\}^*$ into the subgroup of $E'(F_q)$ which is the kernel of the dual isogeny $\hat{\phi}$. For purposes of illustration, the hash of M, is shown as a respective portion of "other data" 114. In this manner, the respective group for each point P and P' is specified for implementation in a particular cryptographic signature scheme.

At block 308, signing module 110 obtains a random integer r. This is the signer's secret. The signer's secret is generated in the context of two parties (e.g., Alice and Bob) that desire to sign original data and verify associated signed data 116. At block 310, signing module 110 generates a signer's public key as the $r^{th}$ multiple of the point P, denoted r*P, wherein r is the signer's secret. At block 312, signing module 110 calculates a signature τ 126 of the original data, which in this example is a message M, as the $r^{th}$ multiple of the resulting hash of the message M, or τ=r*h(M). For purposes of illustration, isogeny Φ, random number r are shown as a respective portion of "other data" 114.

At block 314, a program module 106 (e.g., signing module 110 or a different program module) publishes τ=r*h(M) 126 along with the point P and the $r^{th}$ multiple of P and the hash function h as a public key 128. The isogeny and the two abelian varieties are also part of the public key information for the system. At block 316, a program module 106 communicates the message M (shown as signed data 116) and signature τ 126 to a second entity, such as to networked computing device 104, for verification. (Set-up data, which is known by both parties associated with devices 102 and 104, includes two elliptic curves 124, the isogeny, point P. and the hash function h. The point r*P is the public key 128 of the signer.)

At block 318, verifier module 118 validates the received message M, which is represented in computing device 104 as cryptographically processed data 122, and its corresponding signature τ by hashing M, computing $e_\Phi(r*P, h(M))$ and comparing it to $e_\Phi(P, τ)$. If they are equal, then the cryptographically processed data 122 (signed message M) has been verified. Otherwise, the integrity of the signed original data is corrupt.

Evaluating a Cartier Pairing

This section indicates how, in certain cases, operations of verifying/ decrypting module 118 (e.g., see block) can compute a Cartier pairing 120 explicitly. Specifically, this section describes how to compute the Cartier pairing if the degree of the isogeny is prime and is co-prime to the group order of the elliptic curve, or at most the square of the degree divides the group order. This covers substantially all cases of cryptographic protocol interests. This is because it is typically desirable to have prime group order, or group order equal to a large prime times a small cofactor like 2 or 3. In one implementation, these operations describe operations of blocks 318 of FIG. 3. In another implementation, these operations describe operations of blocks 408 and 416 of FIG. 4.

Let $\phi: E_1 \to E_2$ be an isogeny of elliptic curves over a finite field k. Firstly, we consider the computational the task of inverting an isogeny, i.e., given $Q \in E_2$ find a $P \in E_1$ such that $\phi(P)=Q$. The inverse image is not unique, unless φ is an isomorphism. Multiplication by m-maps: [m]: E→E. Let n=éE(k). Then, all k-rational points on E are n-torsion points. If m is any integer then [m]=[m mod n] on E(k). Assume that gcd(m,n)=1. This means that [m] gives a permutation of E(k). If m'≡$m^{-1}$ mod n then the "multiplication by m'"-map, [m'], gives the inverse, since

[m']o[m]=[m'm]=[m'm mod n]=[1].

For simplicity, when gcd(m, n)≠1 assume m=1, a prime. Suppose P is a point on E(k). Then [n/1][1](P)=[n](P), so the image of [1] is a subgroup of E(k) of exponent n/1. In particular, if E(k) is a cyclic group then Im[1] is a subgroup of size n/1. Even in this case the problem can be solved. The problem is finding the pre-image of point under an isogeny. Suppose gcd(n/1,1)=1. Then on the subgroup Im[1] the multiplication by [1] map is a permutation, thus it has an inverse. More precisely, if 1'≡$1^{-1}$ mod n/1 then [1']P is a point in Im[1] that maps onto P via the multiplication by 1-map. The proof is similar, if Q=[1']P then note that [n/1]Q=O and also [1]Q= [11']P=P. Next, we consider the case that $1^2$||n and E[1]⊆E(k). Then E(k)≅(Z/mZ)×(Z/mdZ) with 1|m and gcd(m/1,1)=1. Let 1'≡$1^{-1}$ mod (n/$1^2$) where (n/$1^2$)=$m^2$d/$1^2$. The map [1] is a permutation on the image of the multiplication by 1-map on E(k) which as a group is isomorphic to Z/(m/1)Z×Z/(md/1)Z.

Taking Q=[1']P, we have that [1]Q=[11']P and 11'≡1 mod $m^2$d/$1^2$ and so 11'≡1 mod m/1 and also mod md/1. Thus [1]Q=[1]P=P.

Let $\phi: E_1 \to E_2$ be an isogeny, let $\hat{\phi}$ be the dual, and $P \in E_2$. Set m=degφ. Then $[1/m]_{E_1}\hat{\phi}(P)$ is an inverse of P. Here, by $[1/m]_{E_1}$ we mean the procedure to invert the multiplication by [m] map on $E_1$ according to the preceding paragraph. This follows because:

$[1/m]_{E_1}\hat{\phi}(P)=[1/m]_{E_1}\hat{\phi}\phi(Q)$ where $P=\phi(Q)=[1/m]_{E_1}$
$[m]_{E_1}Q=Q.$ In this manner, an isogeny is inverted in the time used to evaluate $\hat{\phi}$.

Exemplary Application

Let $\phi: E_1 \to E_2$ be an isogeny. Then there is a bilinear pairing $e_\phi$: ker φ×ker $\hat{\phi} \to \mu_{deg\phi}$.

This pairing satisfies the following useful property:

$e_\phi(P,\phi(Q))=e_{deg\phi}(P,Q)$ where the quantity on the right is a Weil pairing on the deg φ-torsion points. Since the map $\phi: E_1[deg] \to ker\hat{\phi}$ is subjective (with kernel ker φ). This identity is used to evaluate the $e_\phi$ pairing.

Let deg φ=1 be a prime degree isogeny. Assume that $E_1[1] \subseteq E_1(k)$ and also that $1^3$ does not divide $éE_1(k)$. Then, given (P,Q)∈kerφ×ker $\hat{\phi}$, and since Q is in the image of φ: $E_1[1] \to E_2$, the isogeny φ is inverted as discussed above to find a point $R \in E_1[1]$ that maps to Q. A Weil-pairing $e_1(P, R)$ is computed to find the value of $e_\phi(P, Q)$. This provides a randomized polynomial time algorithm with one evaluation of the isogeny $\hat{\phi}$ to compute the Cartier pairing. Observe that if we have only φ in hand then we can still evaluate $e_\phi(P,Q)$ by using the fact that $e_\phi(P,Q)=e_{\hat{\phi}}(Q,P)^{-1}$ and to compute the latter we compute φ; it not being necessary to compute $\hat{\phi}$. In particular, if $\hat{\phi}$ or φ can be evaluated efficiently. In this manner, the systems and methods of system 100 provide an efficient algorithm to compute the Cartier pairing 112.

Exemplary Identity-Based Encryption

Figure 4:
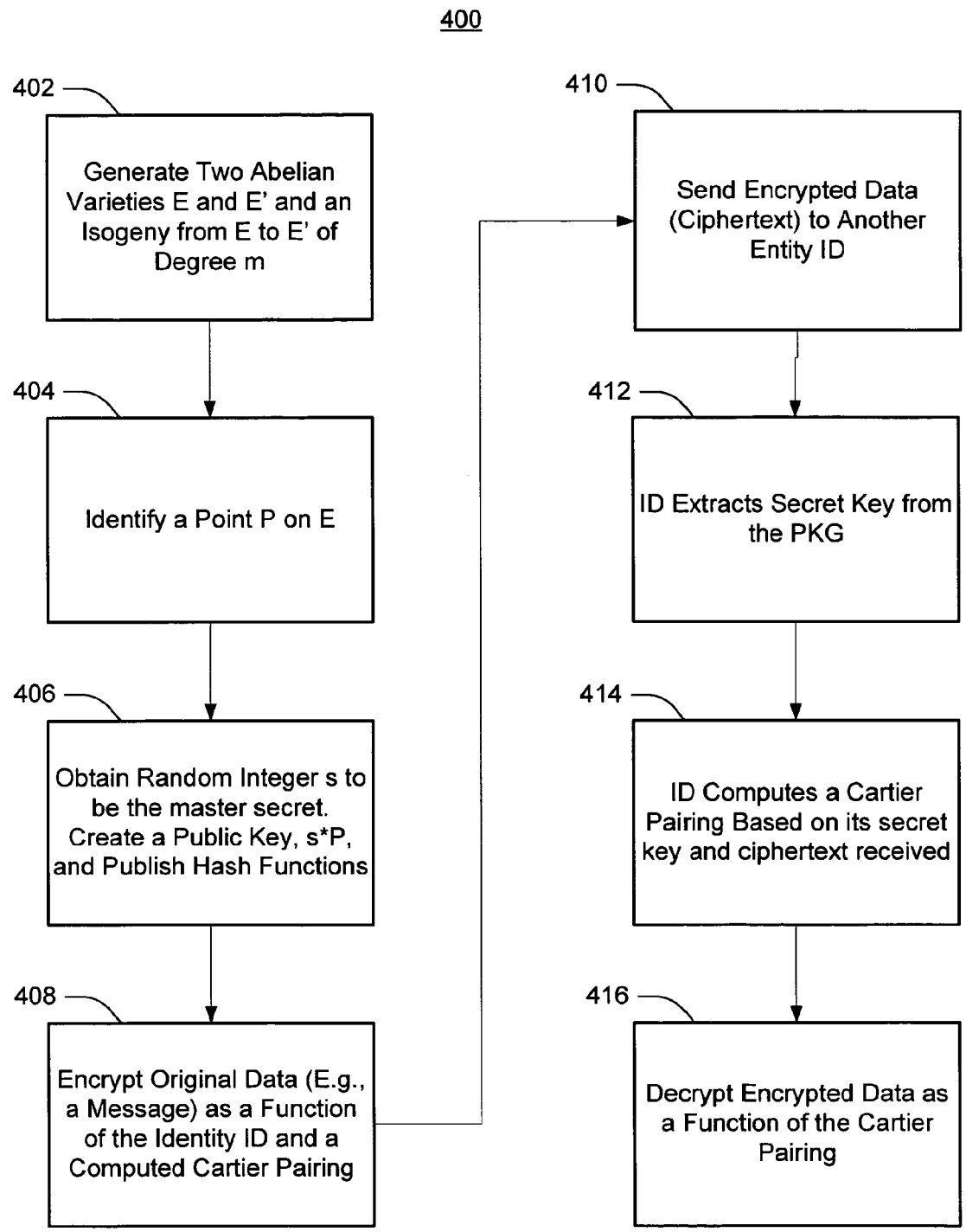
FIG. 4 shows an exemplary procedure to implement identity-based encryption using Cartier pairing.

FIG. 4 shows an exemplary procedure 400 of system 100 for identity-based encryption (IBE) based on Cartier pairing. The particular pairing-based IBE algorithm selected to encrypt and decrypt the data is arbitrary and a function of the particular cryptology architecture selected for implementation. For instance, once Cartier pairing 112 is determined, the pairing is used to respectively encrypt original data using any of the possible pairings-based IBE cryptographic algorithms. For purposes of discussion, the operations of procedure 400 are described with respect to components of FIG. 1. The left-most digit of a component reference number identifies the particular figure in which the component first appears.

At block 402, a Public Key Generator (PKG) generates as public parameters two abelian varieties E and E' over a finite field, $F_q$, and an isogeny, $\phi$, from E to E' of degree m. In one implementation, the public key generator is implemented by signing/encryption module 110 (FIG. 1). In another implementation, public key generator is an "other program module" 111. At block 404, the public key generator generates a point P on E 124 in the kernel of $\phi$, which is also public. At block 406, the public key generator generates a random integer s as the master secret, and makes public the point s*P (public key 128). In one implementation, at block 406, the public key generator also specifies two cryptographic hash functions, $h_1$ and $h_2$, to be public. For purposes of exemplary illustration, the hash functions are shown as a respective portion of "other data" 114 of FIG. 1. Hash function $h_1$ takes bit strings and hashes them into a point on E' 124 in the kernel of the dual isogeny. Hash function $h_2$ takes elements of order dividing m in the multiplicative group of a finite field, $F_q*$, and hashes them into bit strings of length n equal to the length of the messages for the system. So the public information for the system, which is made available by the public key generator, is (E, E', $F_q$, $\phi$, P, s*P, $h_1$, $h_2$, n).

An identity ID (e.g., a recipient of an encrypted message, such as decrypting module 118) can extract the secret key corresponding to the identity from the PKG (public key authority) as follows. The public key generator computes $h_1(ID)=Q_{ID}$, and sends the secret key s*$Q_{ID}$ back to the ID who received the message. The PKG sends the decryption key s*Q_ID back to the ID who received the message.

At block 408, signing/encryption module 110 encrypts a message (e.g., original data) to the identity ID by computing $h_1(ID)=Q_{ID}$ and chooses a random integer, r, modulo m. Signing/encryption module 110 computes Cartier pairing 112 of s*P with $Q_{ID}$, $g_{ID}=e_\Phi(s*P, Q_{ID})$. Signing/encryption module 110 encrypts the message M to generate encrypted data (or ciphertext) 116. Thus, data is encrypted as a function of an identity ID and a computed Cartier pairing. In one implementation, the identity ID is an email address for a person, for example, represented as a bit string. For example, the bit string ID is hashed into a point on the second abelian variety (in the kernel of the dual isogeny). Call this point Q_ID. Then, the encryptor 110 computes a Cartier pairing 112 of $Q_{ID}$ with the global public key for the system (maintained by PKG). The value of that pairing is called g_ID. With respect to the computed Cartier pairing, the encryptor 110 uses s*P to evaluate the pairing, but also generates random r and sends r*P.

At block 410, signing/encryption module 110 sends ciphertext c=(U,V), where U=r*P and V=M+$h_2(g_{ID}{}^r)$, where the '+' sign indicates binary addition of bit strings to a remote computing device 104. At block 412, and responsive to receiving encrypted data 116 (shown as encrypted data 122 with respect to computing device 104), decrypting module 118 extracts from PKG (the public key authority), a secret key s*$Q_{ID}$ corresponding to the encrypted data 122. At block 414, decrypting module 118 uses the secret key to compute Cartier pairing 120 of U-and s*$Q_{ID}$, $h_{ID}=e_\Phi(U, s*Q_{ID})$. At block 416, decrypting module 118 decrypts encrypted data 122 as M=V+$h_2(h_{ID})$.

An Exemplary Operating Environment

Figure 5:
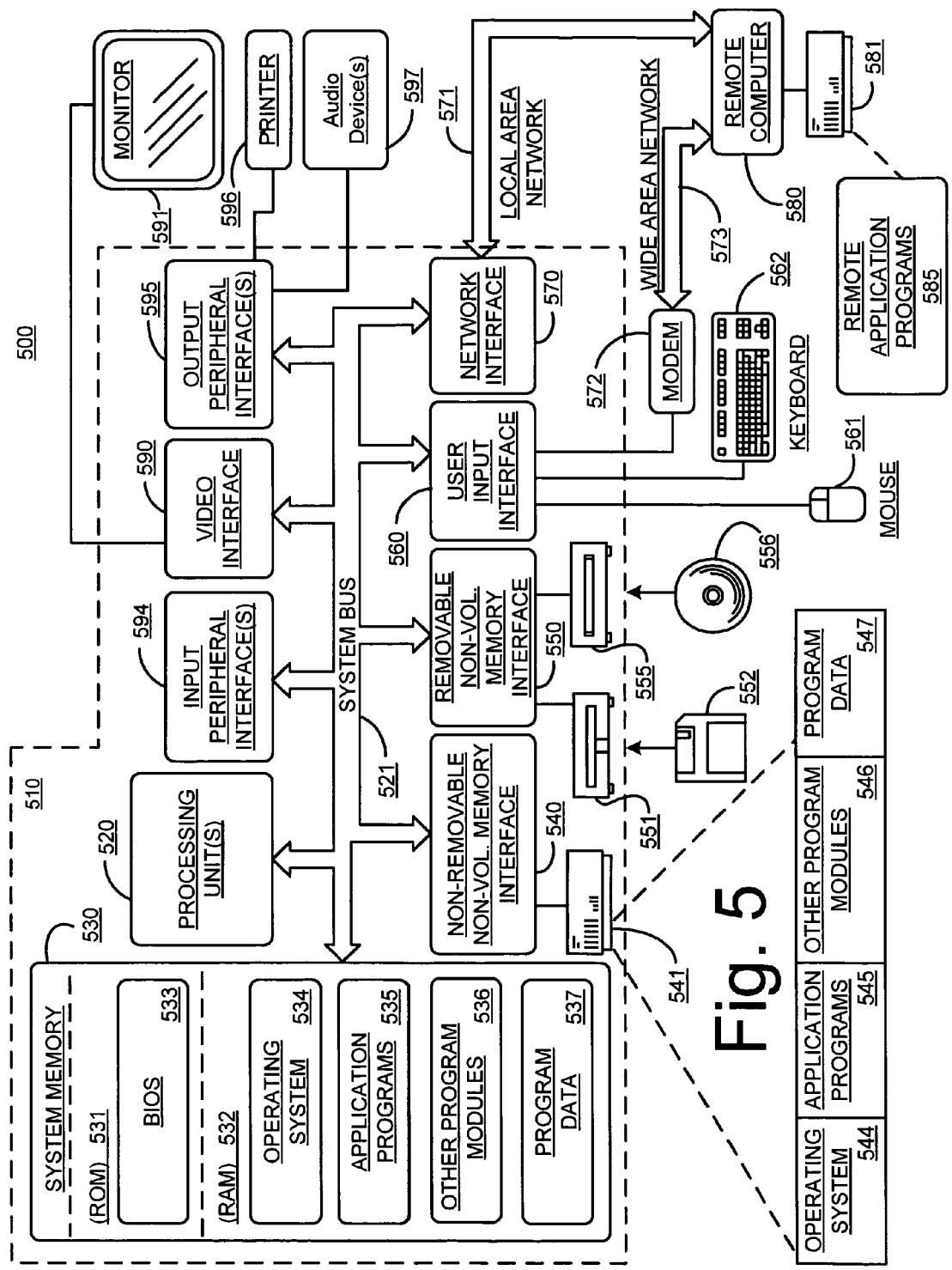
FIG. 5 illustrates an example of a suitable computing environment in which cryptographic processing of data based on Cartier pairing may be fully or partially implemented.

FIG. 5 illustrates an example of a suitable computing environment in which cryptographic processing of data based on a Cartier pairing may be fully or partially implemented. Exemplary computing environment 500 is only one example of a suitable computing environment for the exemplary system of FIG. 1 and exemplary operations of FIGS. 2-4, and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for cryptographically processing data based on Cartier pairing includes a general purpose computing device in the form of a computer 510 implementing, for example, system 100 of FIG. 1. The following described aspects of computer 510 are exemplary implementations of computing devices 102 and/or 104 of FIG. 1. Components of computer 510 may include, but are not limited to, processing unit(s) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer-readable media. Computer-readable media can be any available media that can be accessed by computer 510 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Application programs 535 includes, for example program modules of computing devices 102 or 104 of FIG. 1. Program data 537 includes, for example, program data of computing devices 102 or 104 of FIG. 1. Operating system 544, application programs 545, other program modules 546, and program data 547 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as printer 596 and audio device(s) 597, which may be connected through an output peripheral interface 595.

The computer 510 operates in a networked environment using logical connections to one or more remote computers, such as a remote computer 580. In one implementation, remote computer 580 represents computing device 102 or networked computer 104 of FIG. 1. The remote computer 580 may be a personal computer, a server, a router, a network PC, a peer device or other common network node, and as a function of its particular implementation, may include many or all of the elements described above relative to the computer 510, although only a memory storage device 581 has been illustrated in FIG. 5. The logical connections depicted in FIG. 5 include a local area network (LAN) 581 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example and not limitation, FIG. 5 illustrates remote application programs 585 as residing on memory device 581. The network connections shown are exemplary and other means of establishing a communications link between the computers may be used.

CONCLUSION

Although the systems and methods for cryptographic applications of the Cartier pairing have been described in language specific to structural features and/or methodological operations or actions, it is understood that the implementations defined in the appended claims are not necessarily limited to the specific features or actions described. For example, although signing/encryption module 110 (FIG. 1) and verifying/decrypting module 118 (FIG. 1) are shown on different respective computing devices (i.e., devices 102 and 104), in another implementation, logic associated with these program modules can be implemented on a single computing device 102. Accordingly, the specific features and operations of system 100 are disclosed as exemplary forms of implementing the claimed subject matter.

The invention claimed is:

1. A method comprising:
   in a computer, generating a Cartier pairing from two different abelian varieties E and E' and an isogeny $\phi$ between them;
   in the computer, cryptographically processing data based on the Cartier pairing; and
   wherein the Cartier pairing, with respect to the isogeny $\phi$, is defined as:

$e_\phi(P, P') = e_m(P, Q);$ wherein P is a point on the abelian variety E in a kernel of φ, P' is a point on the abelian variety E' in the kernel of a dual isogeny φ̂, and Q is a point with the property that φ(Q) =P'.

2. A method as recited in claim 1, wherein the cryptographic processing is based on a signature protocol or an identity-based encryption protocol.

3. A method as recited in claim 1, wherein generating the Cartier pairing further comprises:
in the computer, determining a first element P from a first abelian variety of the two different abelian varieties; and
in the computer, determining a second element P' from a second abelian variety of the two different abelian varieties, the first and second abelian varieties not being a same abelian variety.

4. A method as recited in claim 1, wherein generating the Cartier pairing further comprises:
in the computer, determining a first element P from a first abelian variety of the two different abelian varieties; and
in the computer, determining a second element P' from a second abelian variety of the two different abelian varieties by hashing original data onto the second abelian variety, the first and second abelian varieties not being a same abelian variety.

5. A method as recited in claim 1, wherein the Cartier pairing comprises a first element P and a second element P', and wherein cryptographically processing further comprises:
in the computer, determining an isogeny Φ of degree m from a first abelian variety of the abelian varieties to a second abelian variety of the abelian varieties;
in the computer, generating a secret from a random number r,
in the computer, generating a signer's public key as a function of the secret number r and the first element;
in the computer, calculating a signature as the $r^{th}$ multiple of a resulting hash of the original data;
in the computer, signing the original data to generate cryptographically processed data; and
in the computer, validating the cryptographically processed data as a function of the isogeny, a hash of the cryptographically processed data, the signature, and the first element and the signer's public key.

6. A method as recited in claim 1, wherein the two different abelian varieties respectively comprise E and E', and wherein the method further comprises:
in the computer, generating an isogeny Φ of degree m from E to E';
in the computer, identifying a point P on E;
in the computer, generating a random number r and the rth multiple of P, r*P;
in the computer, obtaining a public key s*P; and
in the computer, encrypting data to generate encrypted data as a function of an identity ID, the random number r, and a computed Cartier pairing based on s*P.

7. A method as recited in claim 6, wherein the encrypted data can be decrypted as a function of a Cartier pairing determined from a receiving entity's secret key.

8. A computer-readable storage medium comprising computer-program instructions executable by a processor for:
generating a Cartier pairing from two different abelian varieties E and E' and an isogeny φ between them;
cryptographically processing data based on the Cartier pairing; and
wherein the Cartier pairing, with respect to the isogeny φ, is defined as:

$e_φ(P, P') = e_m(P, Q);$ wherein P is a point on the abelian variety E in a kernel of φ, P' is a point on the abelian variety E' in the kernel of a dual isogeny φ̂, and Q is a point with the property that φ(Q)=P'.

9. A computer-readable storage medium as recited in claim 8, wherein the cryptographic processing is a signature scheme or an identity-based encryption scheme.

10. A computer-readable storage medium as recited in claim 8, wherein the computer-program instructions for generating the Cartier pairing further comprise instructions for:
determining a first element P from a first abelian variety of the two different abelian varieties; and
determining a second element P' from a second abelian variety of the two different abelian varieties, the first and second abelian varieties not being a same abelian variety.

11. A computer-readable storage medium as recited in claim 8, wherein the computer-program instructions for generating the Cartier pairing further comprise instructions for:
determining a first element P from a first abelian variety of the two different abelian varieties; and
determining a second element P' from a second abelian variety of the two different abelian varieties by hashing original data onto the second abelian variety, the first and second abelian varieties not being a same abelian variety.

12. A computer-readable storage medium as recited in claim 8, wherein the Cartier pairing comprises a first element P and a second element P', and wherein the computer-program instructions for cryptographically processing further comprise instructions for:
determining an isogeny Φ of degree m from a first abelian variety of the abelian varieties to a second abelian variety of the abelian varieties;
generating a secret from a random number r,
generating a signer's public key as a function of the secret number r and the first element;
calculating a signature as the $r^{th}$ multiple of a resulting hash of the original data;
signing the original data to generate cryptographically processed data; and
validating the cryptographically processed data as a function of the isogeny, a hash of the cryptographically processed data, the signature, and the first element and the signer's public key.

13. A computer-readable storage medium as recited in claim 8, wherein the two different abelian varieties respectively comprise E and E', and wherein the computer-program instructions further comprise instructions for:
generating an isogeny Φ of degree m from E to E';
identifying a point P on E;
generating a random number r and the rth multiple of P, r*P;
obtaining a public key s*P; and
encrypting data to generate encrypted data as a function of an identity ID, the random number r, and a computed Cartier pairing based on s*P.

14. A computer-readable storage medium as recited in claim 13, wherein the encrypted data can be decrypted as a function of a Cartier pairing determined from a receiving entity's secret key.

15. A computing device comprising:
a processor; and
a memory coupled to the processor, the memory storing computer-program instructions executable by the processor for:

generating a Cartier pairing from two different abelian varieties E and E' and an isogeny φ between them;

cryptographically processing data based on the Cartier pairing; and determining a first element P from a first abelian variety of the two different abelian varieties; and determining a second element P' from a second abelian variety of the two different abelian varieties, the first and second abelian varieties not being a same abelian variety wherein the Cartier pairing, with respect to the isogeny φ, is defined as:

$e_\phi(P, P') = e_m(P, Q);$ wherein P is a point on the abelian variety E in a kernel of φ, P' is a point on the abelian variety E' in the kernel of a dual isogeny $\hat{\phi}$, and Q is a point with the property that φ(Q)=P'.

16. A computing device as recited in claim 15, wherein the cryptographic processing is a signature scheme or an identity-based encryption scheme.

17. A computing device as recited in claim 15, wherein the computer-program instructions for generating the Cartier pairing further comprise instructions for:

determining a first element P from a first abelian variety of the two different abelian varieties; and determining a second element P' from a second abelian variety of the two different abelian varieties by hashing original data onto the second abelian variety, the first and second abelian varieties not being a same abelian variety.

18. A computing device as recited in claim 15, wherein the Cartier pairing comprises a first element P and a second element P', and wherein the computer-program instructions for cryptographically processing further comprise instructions for:

determining an isogeny Φ of degree m from a first abelian variety of the abelian varieties to a second abelian variety of the abelian varieties;

generating a secret from a random number r, generating a signer's public key as a function of the secret number r and the first element;

calculating a signature as the $r^{th}$ multiple of a resulting hash of the original data;

signing the original data to generate cryptographically processed data; and validating the cryptographically processed data as a function of the isogeny, a hash of the cryptographically processed data, the signature, and the first element and the signer's public key.

19. A computing device as recited in claim 15, wherein the two different abelian varieties respectively comprise E and E', and wherein the computer-program instructions further comprise instructions for:

generating an isogeny Φ of degree m from E to E';

identifying a point P on E;

generating a random number r and the rth multiple of P, r*P;

obtaining a public key s*P;

encrypting data to generate encrypted data as a function of an identity ID, the random number r, and a computed Cartier pairing based on s*P; and wherein the encrypted data can be decrypted as a function of a Cartier pairing determined from a receiving entity's secret key.

* * * * *